Feb. 13, 1940.    M. DEMONTVIGNIER    2,190,353
CONTROL DEVICE FOR RECTIFIERS WITH IONIZED VAPOR
Filed Dec. 3, 1932    7 Sheets-Sheet 1
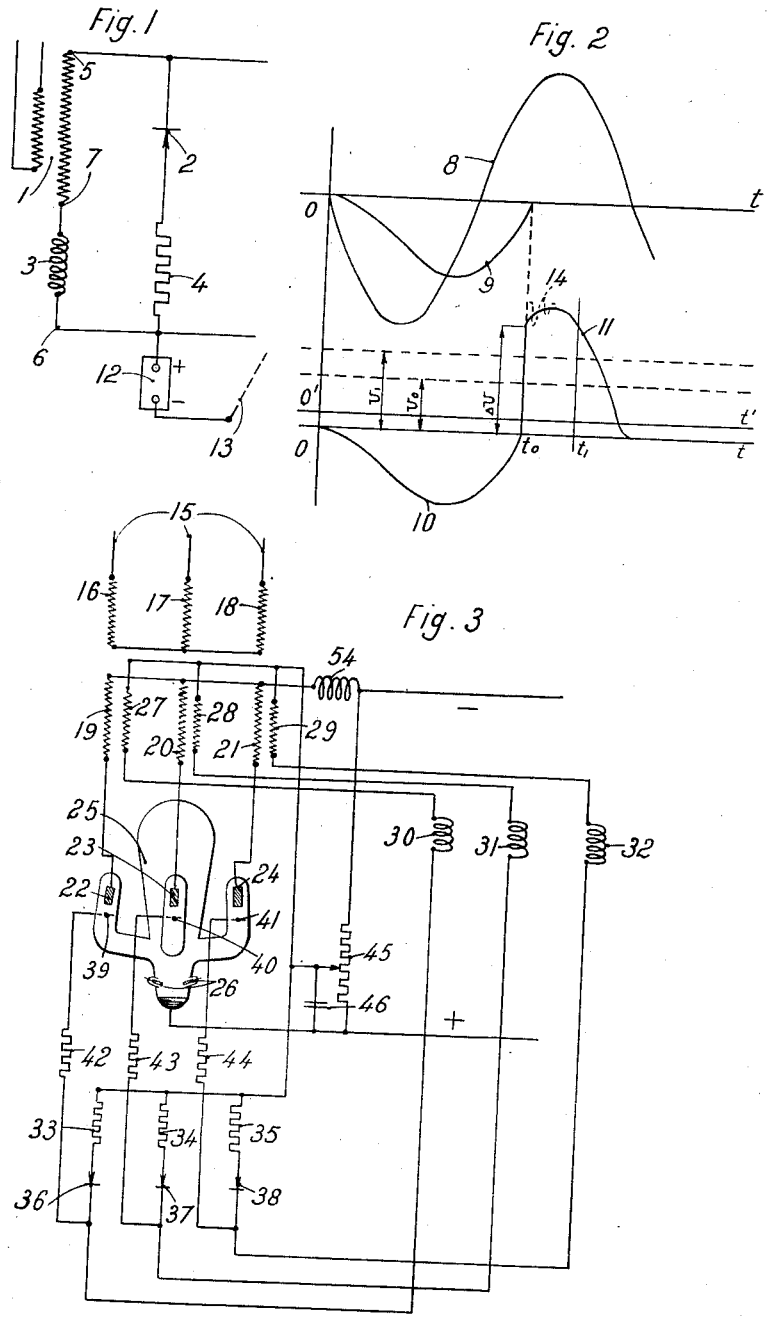
M. Demontvignier
INVENTOR
By Marks & Clerk
ATTYS Feb. 13, 1940.                M. DEMONTVIGNIER                2,190,353
                CONTROL DEVICE FOR RECTIFIERS WITH IONIZED VAPOR
                        Filed Dec. 3, 1932         7 Sheets-Sheet 2
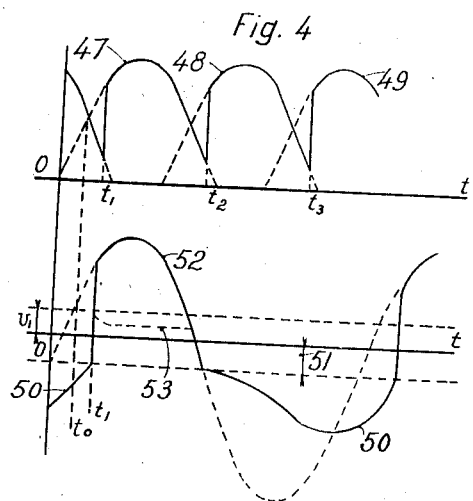
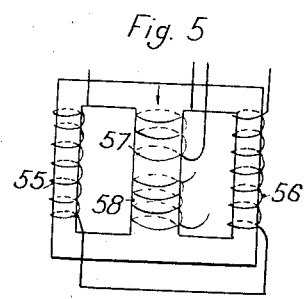
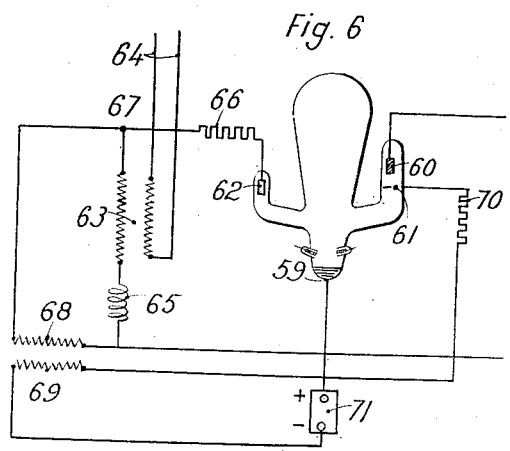
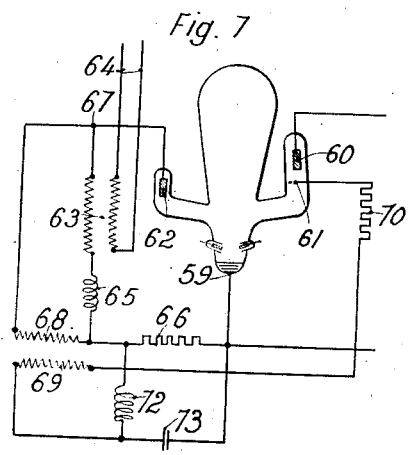
M. Demontvignier
INVENTOR
By: Marks & Clerk
Attys.

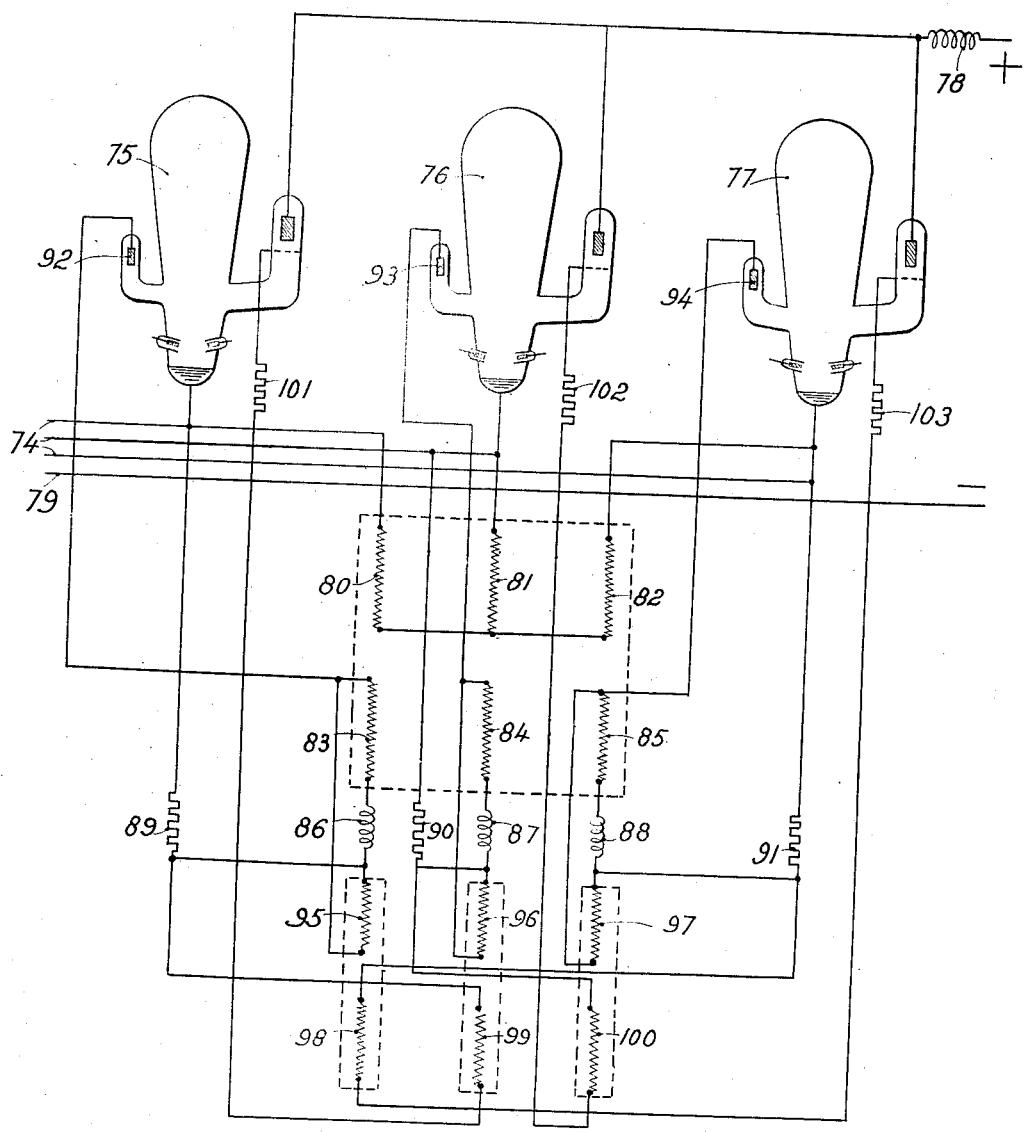

Feb. 13, 1940.                    M. DEMONTVIGNIER                    2,190,353
                   CONTROL DEVICE FOR RECTIFIERS WITH IONIZED VAPOR
                            Filed Dec. 3, 1932            7 Sheets-Sheet 5
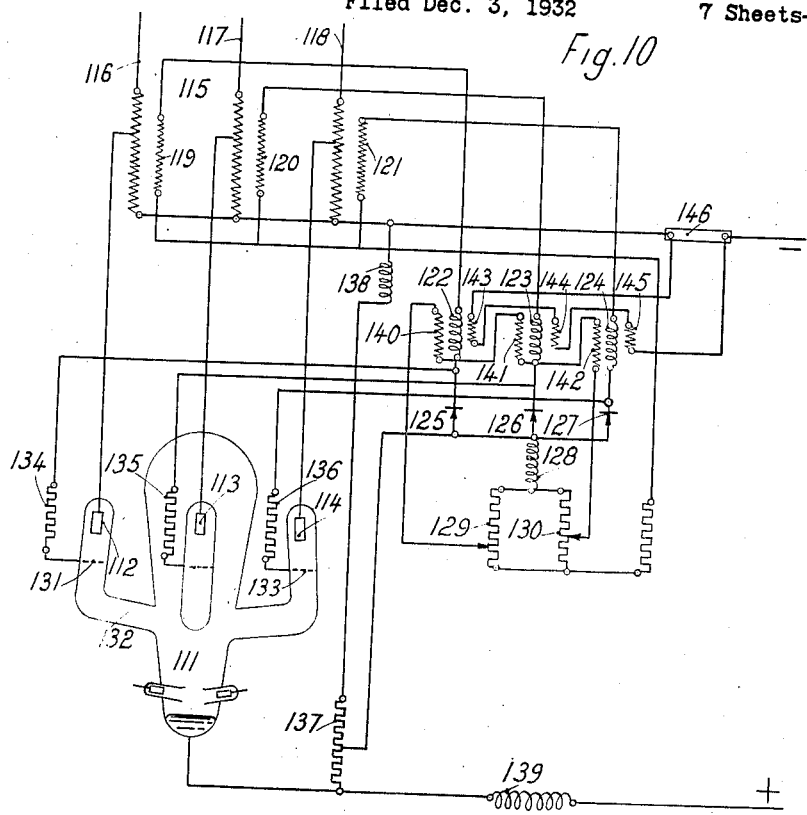
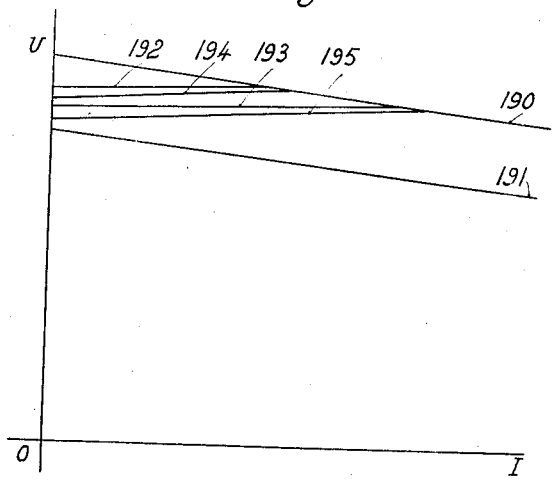
M. Demontvignier
INVENTOR
By: Marks & Clerk
ATTYS.

Feb. 13, 1940.　M. DEMONTVIGNIER　2,190,353
CONTROL DEVICE FOR RECTIFIERS WITH IONIZED VAPOR
Filed Dec. 3, 1932　7 Sheets-Sheet 6
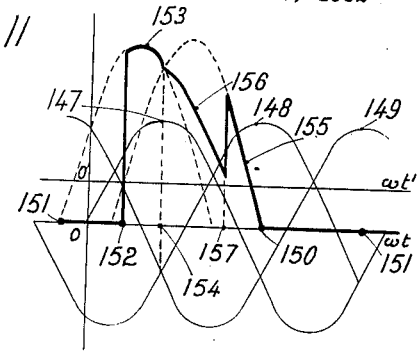
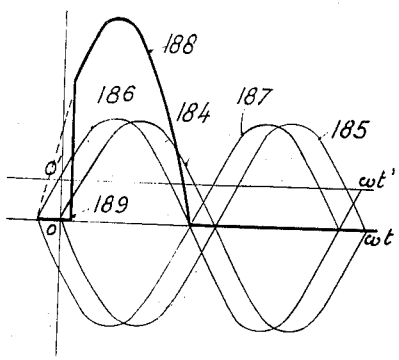
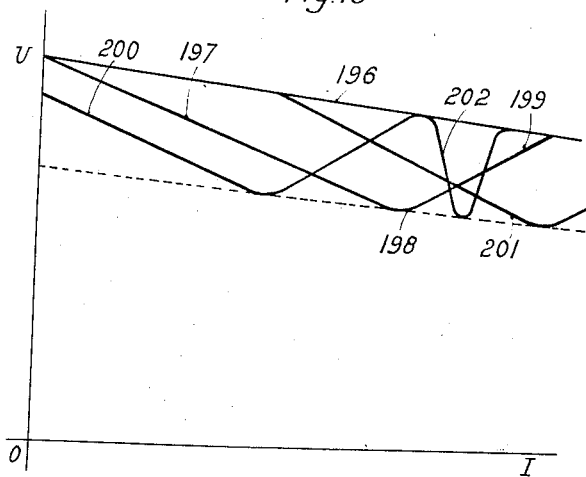
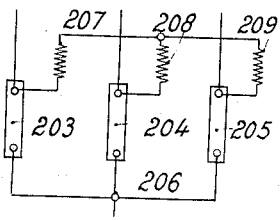
M. Demontvignier
INVENTOR
By: Markes & Clerk
Attys.

Feb. 13, 1940.                M. DEMONTVIGNIER                    2,190,353
              CONTROL DEVICE FOR RECTIFIERS WITH IONIZED VAPOR
                   Filed Dec. 3, 1932           7 Sheets-Sheet 7
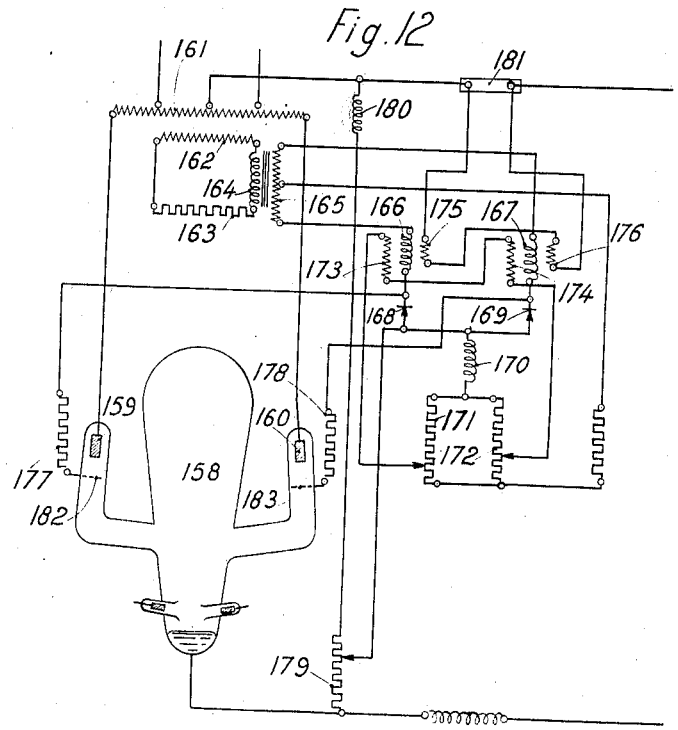
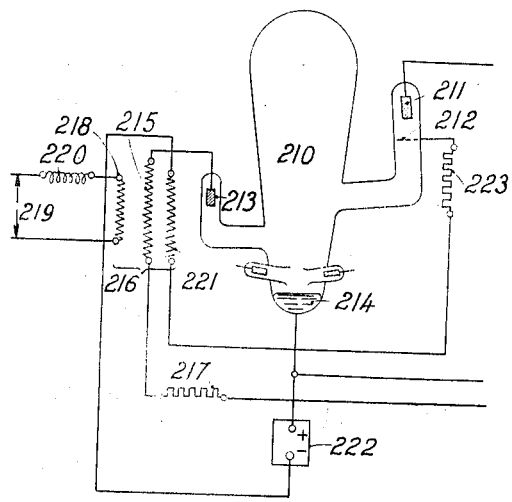
M. Demontvignier
INVENTOR
By Marks & Clark
Attys.

Patented Feb. 13, 1940

2,190,353

UNITED STATES PATENT OFFICE 2,190,353

CONTROL DEVICE FOR RECTIFIERS WITH IONIZED VAPOR

Marcel Demontvignier, Suresnes, France, assignor to Hewittic (Societe Anonyme), Suresnes, France, a corporation of France Application December 3, 1932, Serial No. 645,634
In France December 5, 1931

12 Claims. (Cl. 175—363)

It is a known fact, as set forth in French Patent No. 333,358, that in the case of an electron valve containing ionized vapor, its starting may be controlled by annulling the electrode resistance by the abrupt closing of a circuit comprising an auxiliary electrode which is suitably mounted adjacent the electrode in consideration, at a time which is chosen at will during the course of the period, and this control can be effected by means of a rotary switch adapted for displacement and serving, for instance, to regulate the rectified tension produced by the valve.

It has been proposed, for a like purpose, as specified in the German Patent No. 415,910, to control the auxiliary electrode by means of an alternating tension having the same frequency as the tension supplying the rectifier, and variable in phase with reference to the anode tension.

This latter method has an advantage over the method employing the rotary switch, consisting in the fact that it makes use of stationary devices, but it is attended with a very serious drawback. In fact, and chiefly in the case of valves using a cathode in permanent activity in a liquid metallic bath, the cathode is not fixed in position, since it consists of a cathode spot which is very small and is movable, and it is shown by experience that the instantaneous critical tension which must be applied to the auxiliary electrode in order to overcome the resistance of the anode will depend upon the position of this cathode spot. On the other hand, it varies according to the pressure of the ionized gas contained in the rectifier. For these reasons, when using for the supply of the auxiliary electrodes, an ordinary alternating tension, the starting phase will vary at each instant according to the pressure and to the position of the cathode spot. In fact, as the variation of the controlling tension is always gradually effected, the phase for which it attains the critical starting value will vary continually, resulting in an unstable operating and in continual fluctuations of the mean current supplied by the valve. The same drawback occurs in another proposed device (British Patent No. 274,192) relating to the use, for the control of the auxiliary electrode, of a tension obtained by the superposition of an alternating tension and a continuous tension, which latter may vary and will thus permit any desired displacement of the starting instant.

The present invention relates to a series of devices for the obtainment, by stationary means, of the abrupt variation of the tension applied to the auxiliary electrode, in a manner which is analogous to that of a rotary switch, and the instant at which this abrupt variation takes place may be selected at will in the period, and the amplitude of this variation may be selected at a sufficient value that the instant of starting in action will be made independent of the position of the cathode spot and of the amount of the pressure.

It is possible to employ for this purpose, oscillations of relaxation which are obtained by the use of vacuum tubes containing three electrodes, or of spark-producers operating in gas, but such devices will not afford the stability which is required for industrial operation, and will not enable the ready obtainment of abrupt variations of tension having a sufficient amplitude.

For the aforesaid purposes, the present invention utilizes the abrupt variations of tension taking place between the suitably chosen terminals of an auxiliary rectifier supplying a circuit comprising resistance and inductance, and the said rectifier may further be replaced by a spark-producer which is properly selected.

The following description, with reference to the accompanying drawings which represent various circuits as well as explanatory curves, sets forth the principle of the invention and the manner in which it may be carried into effect.

Fig. 1 shows a circuit permitting to explain the principle of the invention.

Fig. 2 represents, in function of the time, the curves of the currents and tensions relative to the circuit shown in Fig. 1.

Fig. 3 shows the use of the circuit represented in Fig. 1 for regulating the starting of a three-phase rectifier.

Fig. 4 represents, in function of the time, the curves of the tensions relative to the circuit shown in Fig. 3.

Fig. 5 shows the construction of the inductances employed in the circuit of Fig. 3.

Figure 9:
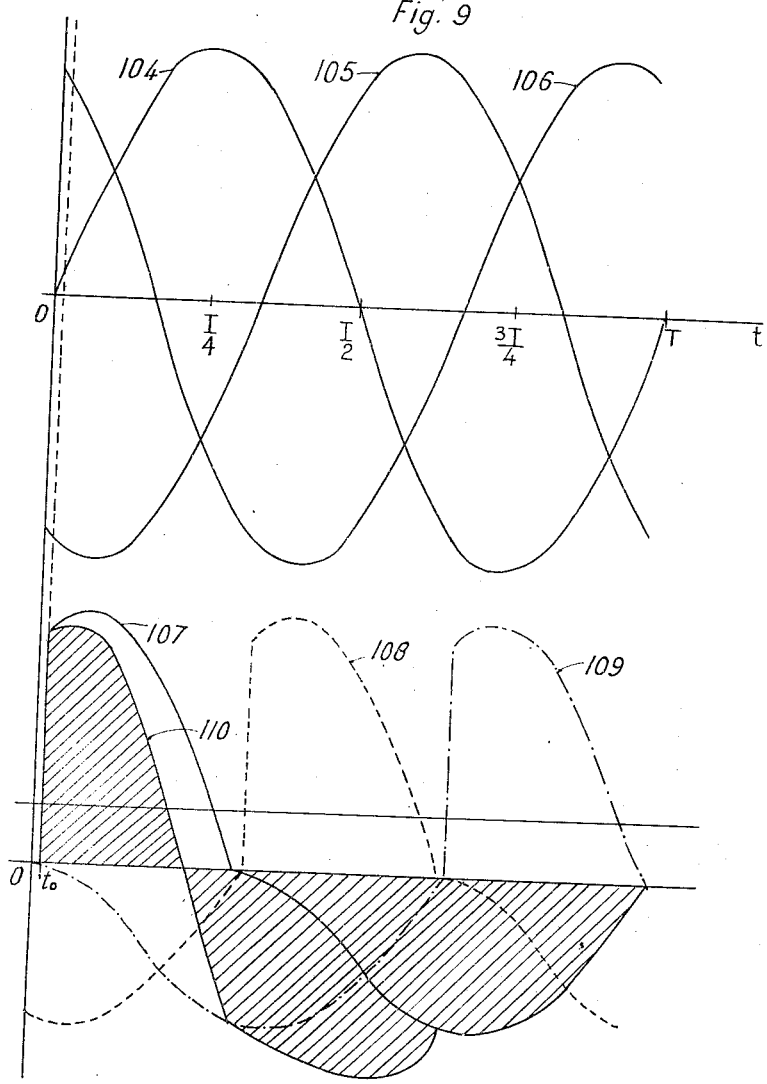

Figs. 6 and 7 relate to two embodiments of the invention, comprising an additional anode used with the rectifier whose starting is to be regulated.

Fig. 8 shows the use of the invention for the starting of a set of three valves.

Fig. 9 shows, in function of the time, the curves of the tensions employed in the circuit of Fig. 8.

Fig. 10 relates to a device for the control of the grids of a three phase rectifier, for regulating the tension supplied by the latter.

Fig. 11 is a diagram of the tensions controlling the grids obtained by the use of the circuit shown in Fig. 1.

Fig. 12 shows the corresponding diagram for a single-phase rectifier.

Fig. 13 shows the diagram of the tensions controlling the grids, as obtained by the use of the circuit represented in Fig. 3.

Figs. 14 and 15 relate to forms of the curves for drop of tension which can be obtained with the aforesaid devices.

Fig. 16 indicates a perfected arrangement of circuit, permitting the use, as the auxiliary rectifier, of an anode which is added to the main rectifier.

Fig. 17 shows the use, as the auxiliary rectifier, of the combination of the cathode of the main rectifier and an anode added to the latter.

Referring to Fig. 1, we may consider a source of alternating tension, which consists, for example, of a transformer 1 whose secondary supplies the valve 2 through the inductance 3 and the resistance 4. It may be supposed, for the sake of simplicity, that the resistance of the valve 2 is null for the permeable direction and is quite considerable for the other direction (in which case the direct resistance coincides with the resistance 4). It is desired to find in what manner the potential varies between the terminals 5 and 6. For this purpose, reference is made to Fig. 2, which represents, by the curve 8, the tension between the terminals 5 and 7, and by the curve 9, the current flowing in the entire circuit in the direction for which the valve is permeable. When the valve is delivering, the difference of potential between 5 and 6 is represented by the curve 10 for the ohmic drop in the resistance 4. When the valve is not delivering, the tension between 5 and 6 is equal to the tension furnished by the secondary of the transformer 1, as shown by the curve 11. When the direct current from the rectifier is annulled, the difference of potential between 5 and 6 is thus abruptly increased from zero to the ordinate of the curve 11. If the valve 2 possessed, in addition to an internal resistance (incorporated upon this supposition into the resistance 4) a constant drop of tension, which is independent of the direct current and is represented by the distance OO′, the current representing the tension between the terminals 5 and 6 would remain the same, but would be referred to the axis O′t′ instead of to the axis Ot. Again, OO′ may represent the electromotive force of a source of continuous tension 12 which is connected in series with the circuit included between the terminals 5 and 6.

It is thus observed that in the present arrangement, the whole action takes place as if, for the instant $t_0$, the tension between the terminals 5 and 6 (or 5 and 13) were abruptly changed over from one source of tension to another. This hence affords, by stationary means, an arrangement which is equivalent to that of a rotary switch.

It is obvious that such tension, when applied between the controlling electrodes and the cathode of a valve containing ionized vapor, will effect the starting for the instant $t_0$, even when the critical starting tension varies between $U_0$ and $U_1$, as shown in Fig. 2. The sole condition to be fulfilled for the fixed position of the starting instant is that the amplitude $\Delta U$ of the discontinuity of the tension shall be made much greater than $U_1$, the maximum value of the critical tension. However, the amplitude of $\Delta U$ can be regulated at will by selecting the amplitude of the tension 8.

As concerns the starting instant $t_0$, its position will depend, relative to the sinusoid 8, solely upon the ratio between the inductance 3 and the resistance 4, and an increase in this ratio will give rise to a time delay and a reduction which causes an advance. Thus it can be varied at will by acting upon the resistance 4 or the inductance 3, but it is advisable to take measures in order that in the interval of the variation employed for the starting instant (for instance from $t_0$ to $t_1$ in Figure 2) the abrupt variation of tension will always be much greater than $U_1$, and this can be readily done by the proper choice of the tension 8. The variation of the ratio between the inductance 3 and the resistance 4, controlling the displacement of the starting instant, can be effected by hand or automatically, according to the current or the tension supplied by the rectifier under the control of the aforesaid arrangement.

It has been supposed, according to the preceding considerations, that the circuit contains no capacity. If it were otherwise, this would add to the curve of the tension of the damped oscillation 14; if this capacity were reduced to a small value, the rapidity of the variation of the tension at the instant $t_0$ will not be appreciably changed.

The supposition has also been made that the output used between the controlling electrode and the cathode remains negligible as compared with the current passing through the auxiliary valve 2; this condition can be readily obtained in practice, due to the very small power required for the control of the starting of a rectifier, and on the other hand this power is greatly reduced by the use of large impedances in series with the controlling electrodes.

The controlling tension obtained between the electrodes 5 and 6 (or 5 and 13) can be sent into the work circuit directly or by means of a transformer.

As concerns the auxiliary valve 2, this may consist of a dry rectifier employing copper oxide, or of a rectifier using ionized gas, and this may even form part of the main rectifier to be controlled, as will be further set forth.

In the said arrangement, the rectifier may be replaced by a spark-producer of a suitable nature, for instance of the type employing a rare gas, but in this case the amplitude of the abrupt variations of tension which are available would be reduced, as may be readily observed, to the sum of the tensions required to start and to cut off the spark-producer. Several examples of the use of the said arrangement will now be given, but these are obviously not of a limitative nature.

Fig. 3 shows the use of the preceding device for regulating the tension supplied by a three-phase mercury vapor rectifier. A source of three-phase current 15 supplies, through a three-phase transformer whose primary winding consists of three phases 16, 17, 18 and whose main secondary consists of three phases 19, 20, 21, the main anodes 22, 23, 24 of the valve 25. This latter is provided with electrodes for maintaining the arc 26 which are supplied by means not shown in the figure. An auxiliary secondary winding which consists of three sections 27, 28, 29 is also provided upon the feeding transformer. These three windings supply—by means of three inductances windings 30, 31, 32 and three resistances 33, 34, 35—the three auxiliary valves which may be of the type employing copper oxide 36, 37, 38. The three controlling electrodes 39, 40, 41 of the rectifier, which herein consist of grids, are supplied through the resistances 42, 43, 44 by the superposition of a continuous negative tension taken from the terminals of a part of the resistance 45 and filtered by the condenser 46, and three tensions as follows: for the grid 39, the tension at the terminals of the device 33—36; for the grid 40, the tension at the terminals of the device 34—37; for the grid 41, the tension at the terminals of the device 35—38.

The curves 47, 48, 49 (Fig. 4) are the curves of tension supplied by the phases 19, 20, 21, and feeding the respective anodes 22, 23, 24. As concerns the grid 39, for instance, it will be observed, as in the preceding case, that when the valve 36 supplied by the auxiliary winding 27, is furnishing a current in the permeable direction, the tension between the grid and the cathode will be represented by the curve 50 which is obtained by the superposition of the continuous tension 51 at the terminals of the condenser 46, and of the drop of tension in the device consisting of the resistance 33 and the valve 36. When this latter ceases its delivery for the instant $t_1$, the tension between the cathode and the input end of the grid resistance 42 will be abruptly upon the sinusoid 52 representing the tension furnished by the winding 27. The starting of the anode 22 thus takes place at the instant $t_1$, and the tension between the grid and the cathode will then be represented by the curve 53. As the resistance 42 is supposed to be very high, the output of the grid will net appreciably affect the form of the tension between the input end of this resistance and the cathode, which is still represented by the curve 52. The tensions applied to the other grids will in like manner make the anodes 23 and 24 active at the instants $t_2$ and $t_3$, and the rectified tension furnished by the rectifier will then be represented by the full-line curve shown at the upper part of Fig. 4.

The starting instants $t_1$ $t_2$ $t_3$ may be displaced at will, in such manner as to regulate the mean rectified tension, and this can be effected by simultaneously modifying the three resistances 33, 34, 35 or the inductances 30, 31, 32. These latter may be varied by magnetic saturation, in the case of inductance coils with iron cores. Each inductance coil 30, 31, 32 may employ a core having the form shown in Fig. 5, and the inductance will consist of the windings 55 and 56 in series, which are mounted on the end cores and are arranged in the direction herein represented, in order that their ampere-turns will not produce any flux in the middle core. This latter has one or more windings, two for instance, 57 and 58, which carry currents depending upon the rectified tensions or currents to be controlled.

It may be supposed, for instance, that it is desired to compensate for the drop of tension on the rectifier when loaded, in order to effect a compounding or an over-compounding. In this case, each middle core of the inductances 30, 31, 32 will carry a winding which is in series with the output circuit of the rectifier; herein, an increase in the output will cause the saturation of the core, resulting in a diminution of the inductances and an advance in the instants of activity $t_1$ $t_2$ $t_3$, and this will tend to increase the tension of the rectifier. It will be observed that it is possible to obtain at will a partial or total compounding or even an over-compounding, by using, with the middle cores of the inductances 30, 31, 32, suitable windings having a greater or less number of turns.

It may be supposed, on the contrary, that it is desired to provide a rectifier whose current is as constant as possible within certain limits of the rectified tension, and for this purpose it is simply necessary to employ upon the middle core of each inductance 30, 31, 32, two windings, one with fine wire which carries a practically constant current obtained for instance from a shunt on the terminals of the rectifier, the current being regulated by a self-adjusting resistance, and the second winding will consist of heavy wire carrying the rectified current or a certain fraction of this current. These two windings are arranged in such manner that their ampere-turns are in opposition, and the number of turns is so selected that a relatively small variation of the output current of the rectifier on either side of the value which is to be maintained, will cause a relatively large variation in the resulting ampere-turns in such direction that a slight increase of output will produce a great reduction of tension, that is, a delay in the instants of activity, or an increase of the inductances. It is evident that this result will be obtained by taking such measures that the ampere-turns of the constant current winding will always be greater than those of the series winding.

Let it be supposed, on the other hand, that it is desired to obtain a rectifier having a practically constant tension. In this case, each inductance 30, 31, 32 will consist of a device as shown in Fig. 5. The middle core is provided only with a fine wire winding carrying a current obtained by using, on a small and constant resistance, the difference between the rectified tension and a tension which is constant and is somewhat greater than the desired value. Herein, a slight reduction of the rectified tension will tend to produce a great increase of the current in the middle winding, thus causing a reduction of the inductances and an advance in the starting instants, and this tends to increase the tension. The constant auxiliary tension may be obtained by the use of an auxiliary rectifier, preceded by a tension regulator, for instance of the magnetic saturation type.

It will be readily observed that in the circuit shown in Fig. 3, the three resistances 33, 34, 35 may be reduced to a single one. There will remain, at the moment of the successive stopping of the three valves in the permeable direction, abrupt variations of tension which can be used to operate the controlling electrodes. The manual or automatic control of the tension of the rectifier may be effected by varying the single resistance employed. It is obvious that the arrangement shown in Fig. 3 is susceptible of numerous modifications. For instance, it is possible to employ a different number of phases, a separate transformer for supplying the auxiliary valves, external controlling electrodes instead of internal grids, and like variations.

As above stated, the auxiliary valves for supplying the grids may consist of a valve which forms part of the rectifier to be controlled, and may be made up of the cathode of this rectifier and an additional anode. As will be further stated, in order to utilize this device, it is necessary to use a transformer which serves to reverse the direction of the abrupt variation of tension.

We may consider, with reference to Fig. 6, a rectifier comprising a cathode 59 consisting of a mercury bath, and may propose to control the starting of the main anode 60 by supplying to the grid 61 a tension of the same form as above specified. For this purpose, an auxiliary electrode 62 is employed, and it is connected upon a source of alternating tension 64, through a transformer 63, an inductance 65 and a resistance 66. The arrangement is the same as in the preceding cases. Let us consider the difference of potential between the point 67 and the cathode: at the time when the anode 62 is put out of action, a sudden diminution of this difference of potential takes place, and in order that this difference of potential should be available for operating the grid, a sudden increase would on the contrary be required. This result can be readily obtained by the use of a transformer whose primary 68 is connected between the point 67 and the cathode, the secondary being connected between the input end of the grid 70 and the negative pole of a source of continuous tension (of any kind) whose positive pole is connected to the cathode. The direction of coupling between primary and secondary is made such that an abrupt diminution of the tension between the point 67 and the cathode will cause an abrupt increase of the tension between the grid and the cathode, the tension at the ends of the secondary 69 having exactly the same form as above specified.

In the case in which an arrangement comprises several rectifiers which are to be controlled, each provided with its cathode, it is obvious that the auxiliary electrode of one of these may be used to control the grid of the other, since the transformer 68—69 can be used to effect all necessary separation of the parts.

As concerns the source of rectified tension 71, it may consist of the auxiliary rectifier itself, and this may be suitably filtered, if necessary. For this purpose, the resistance 66 may be mounted on the side next the cathode, with reference to the combination of the transformer 63 and the inductance 65. The filtering may be effected by an inductance 72 and a condenser 73. It will be noted that this forms a device similar to the one shown in Fig. 6, and the tension controlling the grid has the same form as shown in Figs. 2 and 4. The filtering of the rectified negative tension superposed upon the secondary tension of the transformer 68—69 is optional, and in an arrangement comprising several rectifiers, it is even possible to superpose the negative tension obtained by means of an auxiliary electrode and of the cathode of one of these, upon the secondary tension obtained from the transformer of another rectifier. We will further show the method for the obtainment of a reversed rectifier having three valves of the single anode type, which can be used, for example, for the recovery of energy in a traction sub-station, as set forth in applicant's French Patent No. 705,149.

Fig. 8 shows a source of three-phase alternating tension 74, which supplies the three cathodes of a set of three mercury valves of the single anode type 75, 76, 77, the three main anodes being connected together and to the positive pole of a source of direct current through an inductance coil 78. The neutral point 79 of the source of three-phase tension is directly connected to the negative pole of a source of direct current.

The grids of the three valves are supplied in the following manner. A small auxiliary three-phase transformer whose primary consists of three windings 80, 81, 82 connected on the star system is supplied by the source of current 74, and these windings 80, 81, 82 correspond to the respective valves 75, 76, 77. The secondary of this transformer consists of three separate windings 83, 84, 85, and these windings supply—through inductances 86, 87, 88 and resistances 89, 90, 91—three respective auxiliary electrodes 92, 93, 94. On the other hand, the three small single-phase transformers receive current for their primaries 95, 96, 97, respectively, from the terminals of the devices 83—86, 84—87, 85—88. The secondary 98, for instance, corresponding to the phase 80 and to the valve 75, supplies the grid of the valve 77, through a resistance 103, and superposes, between the grid and cathode, its tension upon the tension at the ends of the resistance 91.

The form which is thus obtained for the tension controlling the grids, is indicated in Fig. 9. The curves 104, 105, 106 are the curves of the tensions at the ends of the windings 80, 81, 82; the curves 107, 108, 109 which are shown respectively by full lines, dotted lines and dot-and-dash lines, represent the tensions at the ends of the windings 99, 100, 98. The curve 110 shown in heavy lines, bounding the hatched area, represents the tension applied between the cathode of the valve 75 and the input end of the resistance 101 leading to the grid of this valve, or in fact, the tension controlling this grid. The curve 110 is obtained by the addition of the ordinates of the curve 107 representing the tension at the ends of the winding 99 and the negative ordinates of the curve 109 which represent—neglecting the drop of tension in the auxiliary arc—the tension at the ends of the resistance 89. Herein, it is supposed that the ratio of transformation of the transformers 95—98, 96—99, 97—100 is equal to unity, but this may be otherwise, and in such case the form of the curves of the tension applied to the grids can be modified at will. In particular, it is possible to increase the negative ordinates of the curve and to reduce the interval during which the grid is positive.

The position of the lighting instant to for the main anode of the valve 75 will depend upon the ratio between the inductance 87 and the resistance 90. An increase of this ratio will cause a delay in the starting, and a diminution will cause an advance. Such increase or diminution can be controlled at will, by manual or automatic means, and the counter-electromotive force of the reversed rectifier may thus be regulated once for all, or according to the load.

Fig. 10 shows a three-phase rectifier whose valve 111 comprises anodes 112, 113, 114 supplied by an auto-transformer serving as a voltage-reducer, and which is itself supplied by three wires 116, 117, 118 of a three-phase line. The said auto-transformer carries an auxiliary winding consisting of three coils 119, 120, 121, which are connected on the star system and whose tensions are respectively in phase with the tensions of the three phases 116, 117, 118; this auxiliary winding feeds—through three inductance coils with iron cores 122, 123, 124—three dry rectifier units, for instance of the copper oxide type, 125, 126, 127, which have a common anode connected to a heavy inductance coil 128; the circuit of the auxiliary rectifier is completed by two resistances 129, 130 and is closed at the neutral point of the three windings 119, 120, 121. The controlling tensions for the grids 131, 132, 133 which are applied—through resistances 134, 135, 136—between the grid and the cathode, are formed by the superposition of the tensions at the terminals of the units 125, 126, 127 and of a continuous negative tension, taken from the ends of a part of the resistance 137 which carries a current filtered by the inductance 138 and produced by the rectified tension of the main rectifier. The device thus described may appear to be similar to the one described with reference to Fig. 3, but it differs from the latter by several very important points of detail. In the first place, the three additional resistances of the auxiliary rectifiers are united in a single one, and the whole device is connected in series with a strong inductance coil. In this manner, the rectified current delivered by the auxiliary rectifier is practically continuous, and if $i_1$, $i_2$, $i_3$ represent the instantaneous currents delivered respectively by the rectifiers, this will afford $i_1+i_2+i_3=$constant, whence $$\frac{di_1}{dt}+\frac{di_2}{dt}+\frac{di_3}{dt}=0$$

In these conditions let it be supposed that we add to the magnetic circuits of the three inductances 122, 123, 124, three similar windings 140, 141, 142 of fine wire, for instance, and that these are connected in series as shown in the figure, no induction will take place in the whole device, and the circuit can be closed upon another circuit, for instance upon two selected points on the resistances 129 and 130, without causing any disturbance.

No special form of magnetic circuit is required in these conditions; a normal single-phase circuit, without air gap, can be very well used. The diagram further shows three heavy wire windings 143, 144, 145 which are connected in series and are closed upon a shunt 146 comprised in the circuit of the main rectifier. In this case, the effect of the continuous ampere-turns in the windings 140, 141, 142 on the one hand and 143, 144, 145 on the other hand, will be that these are added to or subtracted from the continuous component of the ampere-turns due to the windings 122, 123, 124, and thus to saturate or de-saturate the magnetic circuits of the three inductances. The inductance of the windings 122, 123, 124 may thus vary between the inductance corresponding to the complete de-saturation of the magnetic circuits (the continuous component of the resulting ampere-turns being null), and the inductance corresponding to a great saturation. This device affords amplitudes of inductance variation which greatly exceed those obtained with a magnetic circuit of the type shown in Fig. 5, in which the effect can only be produced by saturation.

We will now examine the forms of the curves of grid tension which are obtained. Referring to Fig. 11, the curves 147, 148, 149 represent the simple tensions of the respective phases 116, 117, 118, or those produced by the windings 119, 120, 121. It is desired to observe the variation of the tension at the terminals of the element 125. Let it be supposed, for example, that the ohmic drop of tension in the elements and in the inductance coils is negligible; in these conditions, the element 125 commences its delivery when the tension 147, which is already negative, exceeds in absolute value, the tensions 148 and 149; after this time, represented by the point 150, the tension at the terminals of the element remains equal to the ohmic drop in the latter, that is, it is negligible; at the instant 151, the element 126 begins to deliver in its turn, but the element 125 also continues its delivery, due to the presence of the inductances 122, 123, 124; it ceases to deliver at the time represented by the point 152. From this time onward, as the element 126 is the only one delivering, the tension at the terminals of the element 125 is equal to the difference between the tension of the winding 119 and the tension of the winding 120; it is thus represented by the curve 153. At the instant represented by the point 152, a sudden increase of the tension at the terminals of the element should occur, and the instant 152 varies according to the value of the inductances, the increase in such values causing a delay of this instant, and inversely. For the instant 154, the element 127 commences to deliver in turn, at the same time as the element 126, and it is at once observed that the tension at the terminus of the element 125 will then be equal to the arithmetical mean of the tension represented by the curve 153 and the tension represented by the curve 155, which is defined as the difference between the tensions of the windings 119 and 121. Thus the tension at the terminals of the element 125 is represented by the curve 156, as far as the instant 157, at which the element 126 has ceased to deliver, and the element 127 continues alone. From this time, the tension at the terminals of the element 125 is equal to the difference between the tensions of the windings 119 and 121, and is represented by the curve 155. The tension at the terminals of the element 125 is shown in Fig. 11 by the entire curve in heavy lines. If o o' represents the tension at the ends of the part of the resistance 137 situated on the side next the cathode of the valve 111, it is observed that the tension controlling the grid 131 will be represented by the same heavy line curve, with reference to the base line o' ω t'. For the instant 152, the grid, which is at first negative, is suddenly brought to a positive tension, and thus causes the starting of the anode 112, irrespectively of the internal conditions of the rectifier. The starting instant varies according to the value of the inductances 122, 123, 124, which may be regulated by saturating or de-saturating the magnetic circuits by means of the windings 140, 141, 142 carrying the current shunted on the Wheatstone bridge consisting of the two resistances 129 and 130; in this case it is possible to regulate the starting instants, and hence the tension of the rectifier, by simply displacing the movable contact upon the resistance 130. The current in the windings 143, 144, 145 may also be used for the same purpose. The results which may thus be obtained will be further set forth.

Fig. 12 shows the diagram which is employed in the case of a single-phase rectifier, using the two alternations. The anodes 159 and 160 of the valve 158 are supplied by an auto-transformer 161 adapted to raise the voltage, which carries a winding 162 for the supply of the auxiliary rectifier, this supply being effected through the medium of a system comprising a resistance 163 and an inductance 164 whose core carries a winding 165 which is provided with a middle terminal and feeds the auxiliary rectifier. The object of the system consisting of the inductance 164 and the resistance 163 and taking a current in comparison with which the current absorbed by the rectifier remains small, is to provide at the terminals of the winding 165 a tension which is in advance upon the tension supplying the winding 161, this arrangement being employed for a purpose which will be hereinafter set forth. The auxiliary rectifier, which resembles the one above described, comprises two inductance coils 166 and 167, two dry rectifier elements 168 and 169, a strong inductance coil 170, two resistances mounted after the manner of a Wheatstone bridge, 171 and 172. The magnetic circuits of the inductances, as above stated, carry fine wire windings 173 and 174, and heavy wire windings 175 and 176, for the saturation or the de-saturation, connected in series, in which the sum of induced electromotive forces is null. The grids 182 and 183 are supplied, as above stated, through the resistances 177 and 178, by the resultants of the tensions at the terminals of the elements 168 and 169, and of the tension at the ends of a part of the resistance 179 carrying a current taken from the main rectifier and filtered by the inductance 180. The regulating windings are supplied by a current taken from the circuit of the auxiliary rectifier through the medium of the bridge which is formed by the resistances 171 and 172, and can be used at will to saturate or de-saturate the magnetic circuits. The heavy wire windings may be supplied by current taken from the ends of a shunt 181 connected in the delivery circuit of the main rectifier.

As shown in Fig. 13, the curves 184 and 185 represent the alternating tensions supplying the anodes 159 and 160, and the curves 186 and 187, which have a forward displacement, represent the tensions supplying the elements 168 and 169. It is observed in like manner that the tension at the terminals of the element 168, for instance, is represented by the heavy-line curve 188, which has a discontinuous rise at the instant 189. The tension controlling the grid 182 will be represented by the same curve, referred to the base line o'ωt', oo' being the tension at the terminals of the part of the resistance 179 situated next the cathode of the main rectifier. The necessity for the forward displacement of the tension supplying the auxiliary rectifier will be readily observed. In fact, it should be possible to bring the starting instant to o in order to be able to regulate the tension of the main rectifier to the maximum; however, this instant is always delayed with reference to the zero point of the tension supplying the auxiliary rectifier, as the inductances 166 and 167, even when saturated to the maximum, cannot be annulled. Hence the zero point of this tension should be in advance of that of the curve 184.

In the case of a six-phase rectifier, it is possible to control the grids by means of an auxiliary six-phase rectifier comprising six auxiliary rectifying elements having a common anode, a single inductance coil being used in the continuous circuit. The six elements may also be distributed in two three-phase groups, as shown in Fig. 10, each having an inductance coil similar to the coil 128, and the delivery circuits of the auxiliary rectifiers (resistances 129 and 130, Fig. 10) may be optionally connected together; the control circuits (coils 140, 141, 142 and 143, 144, 145 of Figure 10) may be connected in series or in parallel. The six elements may also be connected in three single-phase groups, as shown in Fig. 12, in which case the arrangement will comprise three inductance coils similar to the coil 170 shown in this figure.

In a general manner, it is possible in a polyphase rectifier, to carry out any desired grouping of phases in the auxiliary rectifier.

There will be now shown by way of example a certain number of possible applications of the above-mentioned devices to the different problems which occur in the regulating of the tension of the rectifiers. The case of the three-phase rectifier will be considered, it being understood that the aforesaid methods apply to any number of phases. It will be supposed in the first place, with reference to Fig. 10, that the shunt 146 is eliminated, the windings 143, 144 and 145 being eliminated or closed upon themselves. In these conditions, it is simply necessary to displace the movable contact of the resistance 130 in order to modify, in either direction, the current in the coils 140, 141 and 142, to saturate or de-saturate the magnetic circuits, and to vary the instant of starting the anodes 112, 113 and 114, and hence the tension of the rectifier. This constitutes a rectifier with manual regulating of the tension, and the limits of regulating may be changed by moving the contact upon the resistance 129. With reference to Fig. 14, a rectifier can be formed which may have as its characteristic for the drop of tension, a straight line such as 191, which is parallel to the one corresponding to the maximum tension 190.

Let it be further supposed that the circuit of the windings 143, 144, 145 is connected to the ends of the shunt 146, in a direction such that an increase of load on the rectifier will increase the saturation of the magnetic circuits, and in this case the starting moment of the rectifier will advance when the load is increased, and the tension will tend to rise. In this manner, according to the resistance of the shunt, a rectifier can be obtained which is compounded or over-compounded, the ordinate at the beginning of the curve for the drop of tension being regulated at will by acting on the movable contact of the resistance 130. It is thus possible to obtain compound characteristics such as 192 and 193, or over-compounded characteristics such as 194 and 195, and such curves will in all cases, when above a given load, be joined to the curve 190 corresponding to the regulating at the maximum tension and to the drop of tension afforded by the transformer. Furthermore, by reversing the direction of coupling of the windings 143, 144 and 145 of the shunt 146, it will be observed in Fig. 15, in which 196 represents the curve for the natural drop of tension of the rectifier for the maximum tension, that this will produce a curve analogous to 197; the current taken by the windings 143, 144 and 145 from the ends of the shunt 146 will de-saturate the magnetic circuits, thus causing an increasing drop of tension depending on the load, and then, starting from the point 198 corresponding to the total de-saturation, again saturating the magnetic circuits in the other direction, in which case the rising part of the curve 199 joins the natural characteristic 196. The part 197 can be used as an anti-compounding curve. By regulating the movable contacts of the resistances 129 and 130, this will afford at will such curves as 200 and 201; this latter will permit, for instance, to exclude a rectifier operating in parallel with other generators, above a given load, while on the other hand, by increasing the resistance of the shunt 146, it is feasible to obtain a characteristic such as 202, whose left-hand part approximately fulfils the conditions affording a delivery for the rectifier which is independent of the alternating tension and of the rectified tension, within certain limits.

The same devices are applicable to the automatic regulating of the tension of rectifiers, against the variations due to the load and to the alternate feeding tension. Various methods can be employed for this purpose. It is possible, for instance, to compound the rectifier by means of the windings 143, 144, 145 and of a shunt, and to use the windings 140, 141, 142 to compensate the variations of the alternate tension, by sending through them a rectified current which varies according to the latter and in the proper direction. It is further possible to add to the magnetic circuits of the windings 122, 123, 124 a supplementary winding carrying a current which is proportional to the difference between the rectified tension to be regulated and a standard tension produced by an auxiliary rectifier provided with tension regulating means. There may be further employed for the same purpose, a single controlling circuit supplied by the diagonal of a Wheatstone bridge, to whose other diagonal the tension to be regulated is applied. This bridge comprises two opposite branches consisting of resistances complying with Ohm's law, and two other branches formed of resistances which do not thus comply. Such an arrangement is only balanced for a determined value of the tension applied to the terminals, and the current in the controlling diagonal will vary in one or the other direction according as the conditions depart more or less from the tension of equilibrium which can be made equal to the value to be obtained for the regulated tension. The sensitiveness of this device can also be increased by the use of three-electrode amplifiers, or the like.

The aforesaid applications are not the only ones which can be obtained by the said devices. In particular, they may be used to obtain the equilibrium of loads between two or more rectifiers supplied by the same transformer. A device which can be employed for the parallel operating of three rectifiers will be described as follows.

With reference to Fig. 16, the three shunts 203, 204, 205 are mounted in the output circuits of the three rectifiers, and are connected at one end to the common point 206 of the three circuits. Each of the three rectifiers is provided with a device for controlling the grids, similar to the one above described; 207 is the heavy wire controlling circuit (corresponding to the set of three coils 143, 144, 145 in series, Fig. 10) of the rectifier supplying the shunt 203; 208 and 209 are respectively the corresponding circuits of the rectifiers supplying the shunts 204 and 205. If the equilibrium of the loads is established, no current will flow in the circuits 207, 208, 209 and no action will take place, but if the equilibrium is disturbed, for instance by an excess of current in the shunt 203, the windings 207, 208, 209 will carry currents in the direction of the arrows, and if the couplings have the proper direction, the tension of the rectifier supplying the shunt 203 will tend to diminish, whilst the tension of the other two will tend to increase, thus acting in the favorable direction for the equilibrium.

By the use of known methods, the parallel working of one or more rectifiers provided with the said devices can be readily obtained. For instance, if the rectifiers are supplied by separate transformers, the controls of the grids are synchronized by connecting, in parallel, the several devices by which they are supplied. In the case of a certain number of three-phase rectifiers, it is simply necessary to mount in parallel, in the several rectifiers, the elements 125, 126, 127 in order to obtain the synchronism.

Inversely, a like arrangement can be used for the control of the grids of several rectifiers working in parallel, and herein the parallel operating is obtained by the known methods.

A description will be further given of an improvement in the arrangement of circuits, in order to employ, as an auxiliary rectifier, the cathode of the main rectifier combined with a supplementary anode used with the latter. As shown in Fig. 17, this improvement is applied to the control of the grid of a rectifier with single anode. The valve 210 which comprises an anode 211 and a grid 212, carries laterally an auxiliary anode 213. The auxiliary rectifier consisting of a cathode 214 and an anode 213, is supplied by the winding 215 of a transformer having three windings 216, in series with a resistance 217; the primary 218 of this transformer is supplied from the source of alternating tension 219, through an inductance 220. The grid 212 is supplied by the third winding 221 of the transformer 216 which is in series with the auxiliary source of continuous tension 222 and a resistance 223. As will be observed, this arrangement is the equivalent of the one shown in Fig. 6, but it differs from the latter by the fact that the inductance of the auxiliary rectifier is now placed in the primary of the auxiliary transformer, and thus all of the windings can thus be mounted together upon the same magnetic circuit. The operation of this arrangement is the same as the operation described with reference to Fig. 6, and the said device is employed in analogous conditions for like purposes.

I claim:
1. A device for the periodic control of the starting of an electric valve containing ionized gas or vapor, comprising an auxiliary valve, an auxiliary source of alternating tension for supplying said auxiliary valve, an inductance and a resistance in the circuit of said auxiliary valve and connections comprising a transformer between the terminals of said auxiliary valve and a controlling electrode and a main electrode of said valve.

2. A device for the periodic control of the starting of an electric valve containing ionized gas or vapor, comprising an auxiliary valve, an auxiliary source of alternating tension for supplying said auxiliary valve, an inductance and a resistance in the circuit of said auxiliary valve, connections between the terminals of said auxiliary valve and a controlling electrode and a main electrode of said valve, and means for varying the ratio between said inductance and said resistance.

3. In an electric translating system, the combination with a vapor electric valve having an anode and a cathode constituting spaced electrodes for the continual flow of current therebetween, of means for controlling the moments of initiation of said flow of current comprising an element of said valve other than said electrodes, a source of alternating potential, means comprising an inductor connecting said source of potential between said element and one of said electrodes, an auxiliary electric valve and a resistor serially connected together, the said auxiliary valve and resistor being in shunt connection with the connections of said source of potential with said element and the said one of said electrodes.

4. In an electric translating system, the combination with a vapor electric valve comprising an anode, a cathode, and a control electrode, of means for controlling the conductivity of said valve comprising a source of alternating potential, means comprising an inductor connecting said source of potential with said control electrode and said cathode, means comprising a second electric valve connected between said electrode and cathode, and means for varying the impedance of said inductor.

5. In an electric translating system, the combination with a vapor electric valve having an anode and a cathode constituting spaced electrodes for the continual flow of current therebetween, of means for controlling the moments of initiation of said flow of current comprising an element of said valve other than said electrodes, a source of alternating potential, means comprising an inductor conductively connecting said source of potential between said element and one of said electrodes, and an auxiliary electric valve connected in shunt with said connections of said source with said element and said one of said electrodes.

6. In an electric translating system, the combination with a vapor electric valve having an anode and a cathode constituting spaced electrodes for the continual flow of current therebetween, of means for controlling the moments of initiation of said flow of current comprising an element of said valve other than said electrodes, a source of alternating potential, means comprising an inductor connecting said source of potential between said element and one of said electrodes, means for varying the impedance of said inductor, and an auxiliary electric valve connected in shunt with said connections of said source of potential with said element and said one of said electrodes.

7. In an electric translating system, the combination with a vapor electric valve having an anode and a cathode constituting spaced electrodes for the continual flow of current therebetween, of means for controlling the moments of initiation of said flow of current comprising an element of said valve other than said electrodes, a source of alternating potential of substantially sinusoidal wave form, means for converting said potential into one of peaked wave form comprising an auxiliary electric valve and means comprising an inductor and a resistor conductively connecting said auxiliary valve with said source of potential, and means for impressing said potential of peaked wave form on said element.

8. In an electric translating system, the combination with a vapor electric valve having an anode and a cathode constituting spaced electrodes for the continual flow of current therebetween, of means for controlling said flow of current comprising an element of said valve other than said electrodes, a source of alternating potential, means for converting said potential into one of peaked wave form comprising an auxiliary electric valve and means comprising an inductor connecting said auxiliary valve with said source of potential, means for impressing said potential of peaked wave form on said element, and means for varying the impedance of said inductor.

9. In an electric translating system, the combination with an alternating current circuit, a direct current circuit, and a vapor electric valve having an anode and a cathode interconnecting said circuits and constituting spaced electrodes for the flow of current therebetween, of means for controlling said flow of current comprising an element of said valve other than said electrodes, means comprising a saturable inductor connecting said alternating current circuit with said element and one of said electrodes, an auxiliary electric valve having an anode connected with one of said electrodes and a cathode connected with said element, and means for controlling the saturation of said inductor in accordance with variations in an electrical characteristic of one of said circuits.

10. In an electric translating system, the combination with an alternating current circuit, a direct current circuit, and means comprising a vapor electric valve having an anode and a cathode interconnecting said circuits and constituting spaced electrodes for the flow of current therebetween, of means for controlling said flow of current comprising an element of said valve other than said electrodes, means comprising a saturable inductor connecting said alternating circuit with said element and one of said electrodes, an auxiliary electric valve having an anode connected with one of said electrodes and a cathode connected with said element, and means for controlling the saturation of said inductor in dependence upon variations in the voltage of said alternating current circuit.

11. In an electric translating system, the combination with an alternating current circuit, a direct current circuit, and means comprising a vapor electric valve having an anode and a cathode interconnecting said circuits and constituting spaced electrodes for the flow of current therebetween, of means for controlling said flow of current comprising an element of said valve other than said electrodes, means comprising a saturable inductor connecting said alternating current circuit with said element and one of said electrodes, an auxiliary electric valve having an anode connected with one of said electrodes and a cathode connected with said element, and means for controlling the saturation of said inductor in dependence upon variations in the flow of current in said direct current circuit.

12. In an electric translating system, the combination with an alternating current circuit, a direct current circuit, and means comprising an electric valve having an anode and a cathode interconnecting said circuits and constituting spaced electrodes for the flow of current therebetween, of means for controlling said flow of current comprising an element of said device other than said electrodes, means comprising a saturable inductor connecting said alternating current circuit with said element and one of said electrodes, an auxiliary electric valve having an anode connected with one of said electrodes and a cathode connected with said element, and means for varying the saturation of said inductor comprising means operable in dependence upon variations in the voltage of said alternating current circuit and means operable in dependence upon variations in the magnitude of the flow of current in said direct current circuit.

MARCEL DEMONTVIGNIER.